United States Patent [19]

Koepcke et al.

[11] 3,881,184

[45] Apr. 29, 1975

[54] ADAPTIVE DIGITAL SERVO SYSTEM

[75] Inventors: Richard Wayne Koepcke; Alvin Murray Patlach, both of San Jose, Calif.

[73] Assignee: International Business Machines Corporation, Armonk, N.Y.

[22] Filed: May 28, 1974

[21] Appl. No.: 473,459

[52] U.S. Cl. .................................................. 360/78

[51] Int. Cl. .......................................... G11b 21/08

[58] Field of Search .............................. 360/78, 106

[56] References Cited

UNITED STATES PATENTS

| | | | |
|---|---|---|---|
| 3,699,555 | 10/1972 | DuVall | 360/78 |
| 3,737,883 | 6/1973 | Sordello | 360/78 |
| 3,800,317 | 3/1974 | Lin | 360/78 |

*Primary Examiner*—Vincent P. Canney

*Attorney, Agent, or Firm*—Nathan N. Kallman

[57] ABSTRACT

The invention relates to an adaptive digital servo system which comprises a track position profile sequencer for generating a sequence of binary position signals, a track correction profile sequencer for generating a sequence of binary correction signals, where there exists a correction signal in the track correction profile sequencer for each position signal in the track position profile sequencer, a present position decoder for generating a binary signal indicative of the actual position of the member being moved and controlled by the servo system, an error generator for comparing the commanded position signal from the track position profile sequencer and the actual position signal to generate a binary error signal, a combination means for combining the generated error signal with the correction signal associated with the position signal used to generate the error signal to form a controlled signal for controlling the actuator of the servo system, a track correction profile generator for extracting the repeatable error component from the error signals being generated by the error generator, and updating means for modifying the correction signals associated with the position signals presently controlling the servo system by a correction signal generated from the repeatable error component extracted from the error signals by the track corrector profile generator.

19 Claims, 8 Drawing Figures

ADAPTIVE DIGITAL SERVO SYSTEM

FIELD OF THE INVENTION

The invention relates to an adaptive digital servo system and more specifically to an adaptive digital servo system capable of updating correction data by sensing changes in the repeatable error component of the error signal being generated by the servo system.

PRIOR ART

Digital servo systems have long been known in the prior art and one example of a digital servo system is U.S. Pat. No. 3,211,976, entitled "Digital Servo System" by J. P. Brule, et al.

In past digital servo systems, the systems were designed by basically modelling the system such that the error signals generated might be processed so as to maintain the moving member to a desired position as commanded by the servo system. Further, there is a class of digital servo systems which repeatedly follows a given commanded path such that there exists within the generated error signal a repeatable error component. This repeatable error will cause the member being moved to lag behind the commanded path, due to the inherent lag in response of any given servo system. This is to say that for a given commanded path, the transducer will in fact follow a path that is the same shape as the commanded path but offset from the desired physical commanded path location.

Where during the modelling this repeatable error can be ascertained, it can be included within the model such that the inherent lag between the movement of the transducer and the commanded positions can be accounted for. However, in the prior art systems, once the system is modelled, any changes in the system which deviate from the model will cause the repeatable error component to reappear again causing the transducer or moving member to lag behind the commanded positions due to the introduction of the repeatable error.

A further problem encountered in the prior art occurs when very accurate positioning of the moving member to a reference member is desired, thereby making the modelling of the repeatable error increasingly difficult. In the prior art, the first approach to the repeatable error is to design and model for the repeatable error at the base frequency of the repeatable error. As the accuracy of the system is increased, the harmonics of the base frequency of the system become increasingly important and must be compensated for. This increase in accountability for harmonics of the base frequency increases the difficulty in modelling the system and increases the likelihood that the parameters of the repeatable error will change during the lifetime of the system thereby introducing errors into the basic model of the system.

It is therefore an object of this invention to provide a new adaptive digital servo system which automatically adapts for the repeatable error component in the servo system.

It is another object of the invention to provide for sensing and adapting the servo system to changes in the repeatable error component of the servo system.

It is still a further object of the invention to adapt for a plurality of harmonics of the fundamental frequency of the repeatable error signal within the servo system.

It is still a further object of the invention to provide a means for retaining the most current correction profile associated with any defined path to which the adaptive digital servo system has been designed to follow.

SUMMARY OF THE INVENTION

The invention relates to a digital servo system which generates a path that is repeatedly followed such that there may exist within the error signal a repeatable error component. The servo system basically is comprised of a track positioned profile sequencer which stores and generates the sequence of commanded positions for each of the paths or tracks that the system is designed to follow. Associated with the track positioned profile sequencer, there exists a track correction profile sequencer which has a correction value stored therein for each position value in the track position profile sequencer. The system compares the actual position of the member being controlled with the present commanded position to generate an error signal and this error signal is added with the correction value associated with the present commanded position to generate a control signal for controlling the actuator of the servo system. The correction signals within the track correction profile sequencer are a series of signals that correction for the repeatable error component that exists within the error signals being generated by the comparison of the commanded position and the actual position of the member being moved. A track correction profile generator extracts from the error signals repeatable error component of the error signals and uses this repeatable error component to update the values in the track correction profile sequencer of the track or path presently being followed such that the correction profile for the track being followed will be corrected so as to produce a correction signal which would null the repeatable error component within the error signal then being generated. The track correction profile generator further has the capability of interrogating the position error signals for a plurality of harmonics of the fundamental frequency of the base frequency of the repeatable error component of the system and to update the correction profile for the track being used in accordance with correction signals for each of the harmonics and fundamental frequency being extracted so as to produce an accurate correction profile for the track being used.

This digital servo system has the advantage that no initial modelling of the servo system as to the repeatable error component must be done in that the system will automatically generate the correct track correction profile for nulling out the repeatable error component of the error signal generated during use.

The digital servo system further has the advantage that the system learns or adapts to changes in repeatable error component and maintains the last correction profile associated with a commanded path such that the next time the path is commanded to be followed, the most correct correction profile known is used in the initial attempt to follow that path. Therefore, if the repeatable error of the system has not changed since the last time the path was used, there will exist within the track correction profile sequencer a track correction profile that is highly accurate and will allow the servo system to compensate for the repeatable error component that exists within the system immediately without any learning time for the system.

Another advantage of this digital servo system is that each commanded path may be treated separately by its own correction profile and no assumption is made that the repeatable error associated with a given path is the same for any other path.

Still another advantage of this invention is that it allows the repeatable error component to be evaluated for a plurality of harmonic signals such that the servo system may position the moving member to a high degree of accuracy by compensating for the harmonics of the fundamental frequency of the repeatable error.

Finally, another advantage of the digital servo system is that it allows the high frequency harmonics of the repeatable error to be compensated for while keeping the bandwidth of the servo signal narrow thereby increasing the signal-to-noise ratio of the system to be greater than that which could have been obtained by prior art servo systems compensating for the same harmonics of the fundamental repeatable error component.

The foregoing and other objects, features and advantages of our invention will be apparent from the following more particular description of the preferred embodiment of the invention as illustrated in the accompanying drawings.

DETAILED DESCRIPTION OF THE PREFERRED EMBODIMENT

Figure 1:
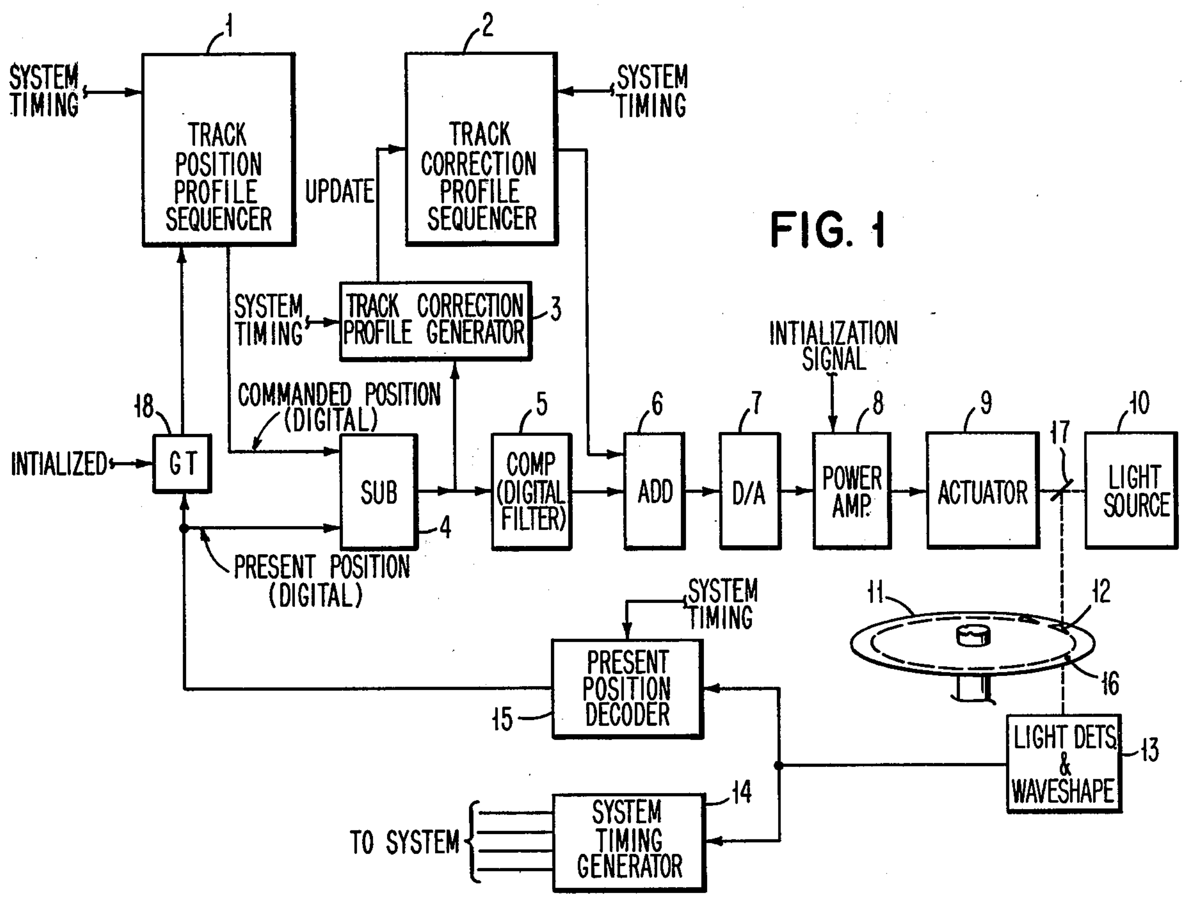
FIG. 1 shows a logic diagram of the elements of the adaptive digital servo system of the invention.

FIG. 1 shows the basic configuration of the adaptive digital servo system. This servo system is taught within the environment of a data storage system where it is desired to move a member 17 to a given position with reference to a rotating disk 16 within the system. The read/write mechanism for transmitting information to and from other storage disks mounted to the same spindle as disk 11 for common rotation is not shown. The read/write mechanism is ganged for movement in accordance with mirror 17 such that when mirror 17 is positioned with regard to disk 11, then the read/write mechanism will be properly located with regard to the rotating storage media with which it is to act for the purpose of storing information. The invention taught here is not the means by which the information is stored on the storage disk but how the servo system is designed such that the transducers can be located to given concentric tracks on the data disk where the track density is in the order of 1,000 tracks per inch.

Track position profile sequencer 1 contains a series of command positions which define a track on disk 11. It will be assumed throughout the discussion of the preferred embodiment that there exists 64 command positions for each track stored within track position profile sequencer 1 and there exists 64 triangular apertures 12 on disk 11.

During the initialization of the system, an initialization signal is given the power amplifier 8 to move actuator 9 so as to position mirror 17 to a known location with respect to disk 11. Light source 10 emits a beam which is reflected by mirror 17 onto disk 11 in the area of the triangular apertures 12 so as to be sensed by light detector and waveshaper 13. The light beam from light source 10 is a narrow beam such as that produced by a laser although a coherent light source is not necessary for this application. The narrowness of the beam allows a high degree of accuracy in generating the position information of the mirror 17 with respect to the apertures in disk 11 by present position decoder 15 which receives the output signal from light detector and waveshaper 13.

During the initialization process, mirror 17 is positioned to a unique position with respect to disk 11 for each track address that is to be used by the servo system. The disk rotates, causing the triangular apertures to modulate the light beam being emitted by light source 10 and detected by light detector and waveshaper 13. The present position decoder 15 will generate a digital numerical value associated with each of the 64 apertures on disk 11 and will cause those 64 values to be passed through gate 18 and be stored within the track position profile sequencer 1. These 64 digital values will define the track position profile for the address that is associated with that position of the mirror 17. It can be readily realized that if there were 1,000 track addresses, the mirror 17 would be stepped to 1,000 unique positions with respect to the triangular apertures 12 on disk 11 to generate 64 unique digital values for each track and to have the 64 values for each of the 1,000 tracks stored within the track position profile sequencer 1. Therefore, when a given track address is entered into track position profile sequencer 1, there will be emitted from that track position profile sequencer 1 a series of 64 digital command signals to be used to control the servo system to cause the servo system to follow the track as defined by those 64 command position signals.

It should be noted that disk 11 contains an index point 16 which provides a basic reference for the start of each of the tracks associated with the servo system and provides a basic synchronization point to correlate the 64 command positions located within track position profile sequencer 1 and the 64 triangular apertures 12 on disk 11 which gave rise to the 64 values as stored.

Once the system is so initialized, the digital servo system is prepared for proper operation. It should be noted that this initialization will generate a track position profile that includes all idiosyncrasies associated with the system including all initial separated errors. If the system should incur no changes, then there will exist no repeatable error components in the error system generated during a servo operation. This fact is due to the initialization process heretofore described.

Track correction profile sequencer 2 is initially set to zero. Track correction profile sequencer has a digital track correction value associated with each and every position command stored within track position profile sequencer 1. When a given address is commanded to track position profile sequencer 1, the same address is inputted to track correction profile sequencer 2 such that it will generate a sequence of 64 digital correction values to be associated with the 64 digital command position values being generated by track position profile sequencer 1.

The output of track position profile sequencer 1 is inputted to subtractor 4 which has its other input from present position decoder 15. The difference between the commanded position and the present position is determined by subtractor 4 and outputted to compensator 5 and track correction profile generator 3. It should be realized that in this way, each of the 64 values will be updated 64 times for a given revolution of disk 11. Compensator 5 is a digital filter and has an analogous use as compensators use in classical analog servo systems. Compensator 5 is well-known and will not be discussed in detail. The output of compensator 5 is a digital value inputted to adder 6. The output from track correction profile sequencer 2 is the second input to adder 6. The output of adder 6 is the summation of the compensated error signal generated by the difference between the commanded position and the actual position of the moving member plus the value of correction generated by track correction profile sequencer 2. The digital output of adder 6 is converted to an analog voltage by digital-to-analog converter 7 which is inputted to power amplifier 8 for controlling the movement actuator 9. Actuator 9 is a linear actuator having mirror 17 connected to its moving member. The movement of mirror 17 causes the light beam to transverse across triangular apertures 12 on disk 11 at different positions in accordance with the signal being received by amplifier 8. Light detector and waveshaper 13 senses the light beam from light source 10 as it is modulated by apertures 12 on disk 11 and presents that modulated signal to present position decoder 15 and the system timing generator 14. Present position decoder 15 generates a numerical value associated with the length of time that the light beam from light source 10 was allowed to strike light detector 13 for each of the 64 triangular apertures 12 on disk 11. The manner in which this number is generated will be discussed in the following more detailed discussion of present position decoder 15. System timing generator 14 generates all the timing signals from the modulated light beam received and detected by light detector 13 to control the transfer of information from track position profile sequencer 1 and track correction profile sequencer 2, track correction generator 3 and present position decoder 15. By using the modulation of the light source to generate the basic timing within this system, the system becomes self-synchronized and no external clock is needed within the positioning system, which eliminates position ambiguity that might be introduced by speed variations.

Track correction profile generator 3 receives the digital error signals as they are generated by subtractor 4. Track correction profile generator 3 extracts from the error signals received the repeatable error component from the error signals and generates a correction signal to be added to the present track correction signals for the track being addressed such that the repeatable error component being sensed by track correction profile generator 3 is nulled.

This system generates a track correction profile of 64 values associated with each track as the track is first used by the system and will generate a profile that is indicative of the repeatable error that exists within the system during actual operation. As was previously stated, if the system undergoes no change then the repeatable error component of the error signals fed into track correction profile generator is zero and the values within the track correction profile sequencer remain zero. However, absolute correction for repeatable error is very difficult and the repeatable error component can change as the apparatus ages. Whatever the cause, if a repeatable error component is sensed by track correction profile generator 3, signals are generated which are stored in track correction profile sequencer 2 in proper order such that when that track is again addressed, the 64 digital values will have been corrected. These corrected values, when applied to the servo system by adder 6, cause the repeatable error component of the error signal generated by subtractor 4 to be nulled.

Figure 2:
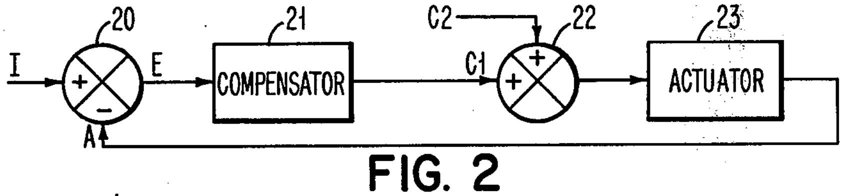
FIG. 2 is a simplified diagram of the servo system of FIG. 1.
Figure 3:
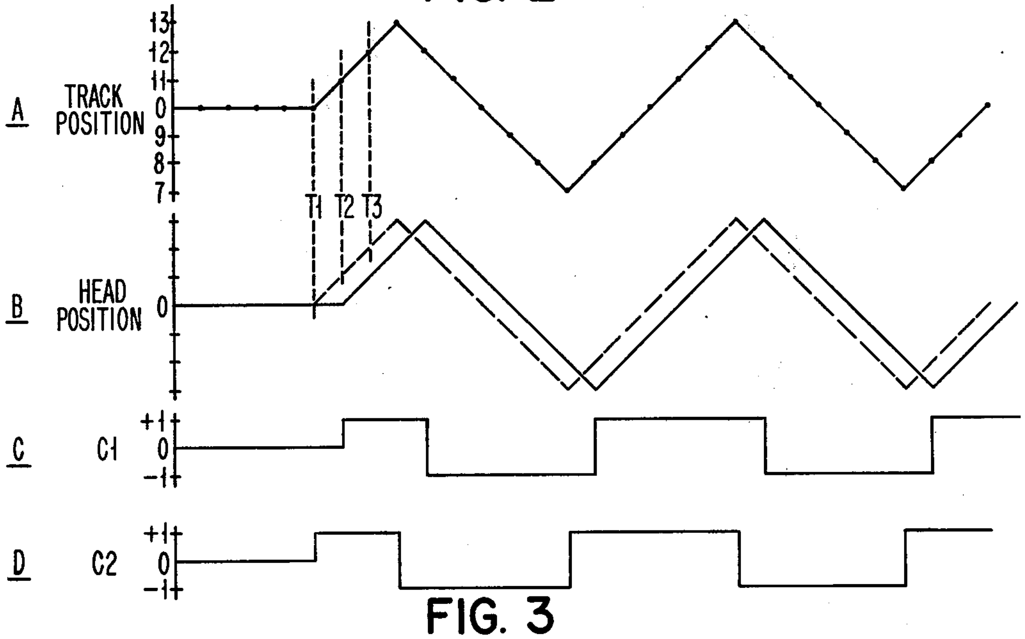
FIG. 3 is a plurality of waveforms demonstrating the operation of the invention of FIG. 1.

The basic action of track correction profile generator 3 by way of the example is to extract the fundamental frequency of the repeatable error plus the second through eighth harmonic of the fundamental frequency. There is no inherent limitation, however, to the number of harmonics which may be used for correction. A fundamental frequency is defined within the system by the rotational speed of disk 11. It is assumed that if any of the eight frequencies are sensed by track profile generator 3, that there exists some component within error signal being generated by subtractor 4 that is repeatable in nature and that corrective action should be taken. In order to make the system less sensitive to transients which might contain frequencies the same as the eight frequencies being sensed, the correction that is made for any given error output of subtractor 4 is attenuated. This effectively dampens the servo system loop with regard to the track correction profile sequencer 2 and while it does make the loop slower to respond to sensed repeatable errors, it does make the same loop insensitive to transient errors which might cause the system to otherwise become unstable. Attention is now drawn to FIGS. 2 and 3 which will demonstrate how the corrective action and use of the track correction profile sequencer is used during the operation of the servo system. FIG. 2 shows the classical servo system having command signal I inputted to subtractor 20 which is used to generate an error signal E by comparing the command I with the actual position A. Comparator signal E passes through compensator 24 and generates a compensation signal C1. Assuming that the compensation signal C2 to adder 22 is zero during this part of the description, compensating signal C1 will control actuator 23 to move the moving member to change the position of the moving member which will be reflected in the servo system by a change in value A of the actual position of the moving member. With reference to FIG. 3, waveform A, let it be assumed that there suddenly occurs a repeatable error into the servo system at time T1. Let it also be assumed that the servo system is sampled such as to produce a signal at the unit intervals as shown by waveform A of FIG. 3.

Assume that the transducer is not moved by the servo system and that the initial position has a value of 10. It can be seen from waveform A of FIG. 3 that the movement of the disk will cause the digital value of the transducer being held constant to vary from a value of 13 to 7. In a digital servo system, sample techniques are used in the control mechanism. This is to say that a digital servo system is not a continuous system but rather generates correction signals at fixed periods of time where each correction signal is used to correct the system until the next correction signal is generated. Due to this fact, there is a time lag between the time that an error occurs and the time that the error is sensed. In the digital system, the actual position value cannot be generated for a sampling period until the end of that period and therefore the error that is generated by comparing the actual position address for a given triangle and the commanded position value for that triangle as generated by the track profile sequencer will be too late in time to actually correct for the error sensed between any difference between the commanded position and the actual position.

It should be realized that this error is due to the physical movement of the track in the system. This is to say that the same track that was initialized to know a value of 10 for all 12 command positions must now be represented by values varying from 7 to 13 due to the physical displacement of the track from its original reference position. However, the initial track profile will always call for the head-to-seek position having a value of 10.

Since no servo system has an instantaneous reaction time, if it is assumed that it takes the servo system one unit time to move one track, then the smooth solid waveform B in FIG. 3 is an indication of the head position with respect to the track position waveform A of FIG. 3. The servo system will sense that the track has moved from position 10 to 11 during the period from T1 to T2 which will cause the head in turn to reposition to position 11 during the period of T2 to T3. It can be seen that by comparing waveforms A and B of FIG. 3 that the head position will always lag the actual track position due to the sampling period.

Waveform C of FIG. 3 shows the compensated error value being generated by subtractor 20 and compensator 21 as an input to adder 22. It basically demonstrates again that the error being sensed is always one sampling period late and therefore introduces this delay in the system for the purpose of compensating for repeatable error. This invention allows that repeatable error to be sensed and extracted from any other error mechanism being generated at the same time and to be so phased with the rotating system so as to generate a correction signal C2 as shown in FIG. 3, waveform D. This correction signal when added into adder 22 will cause the head position to follow the dotted waveform B as shown in FIG. 3, which can be seen to be in phase at the proper magnitude such that the head will follow the track as shown in waveform A of FIG. 3. If, in fact, a moving member follows the track, then the actual position signal being measured will always have a value of 10 and the error signal generated by subtractor 20 will go to zero, assuming that there are no other error components within the system. Therefore, the contribution of correction signal C1 will go to zero and the correction for the repeatable error will be corrected fully by correction component C2 being fed into adder 22.

Finally, it can readily be realized that since the correction profile for a given track is generated in one revolution for use during the next revolution, that the stored values may be so sequenced out of the track correction profile sequencer 2 to account for the delay time of the digital system in generating the error signal such that the proper phase may be obtained for application of the correction signal to the servo system such that the repeatable error component may be nulled.

Figure 4:
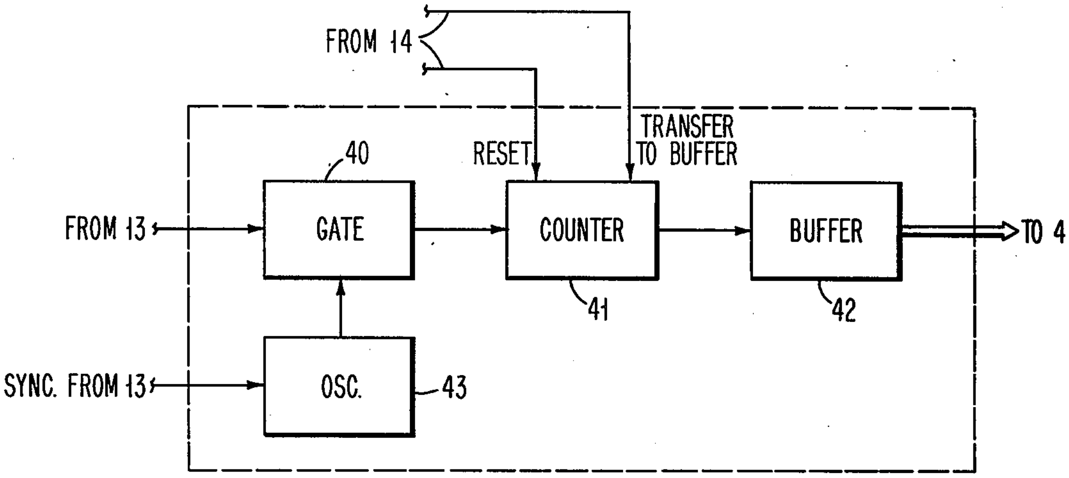
FIG. 4 is a logic diagram of the present position decoder of FIG. 1.
Figure 5:
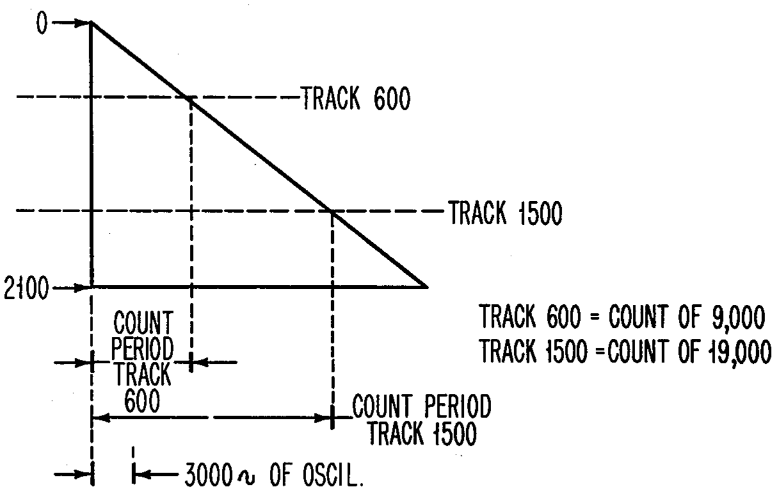
FIG. 5 is a drawing of the triangular apertures and is used to explain how the present or actual position of the moving member is ascertained by the servo system of FIG. 1.

FIG. 5 demonstrates one of the triangle apertures 12 on disk 11. The height of the triangle is located on one of the radii of disk 11. The base of the triangle is tangent to a concentric path about the center of disk 11. Assuming that there are 2,100 tracks to be indicated along the height of the triangle, it can be realized that if the light beam passed along track 600, the light beam would be sensed by the light detector for a period of time as indicated as count period track 600 in FIG. 5. In similar manner, period with reference to track 1500 which would be much longer in duration and is shown as count period track 1500 in FIG. 5. The period of time in which the light beam is sensed by light detector 13 is quantitized by starting a count period from the instant the light beam first is sensed by light detector 13 to the time the light beam is terminated as controlled by the passage of the aperture beneath the light beam. FIG. 4 shows the circuitry for quantitizing that period of time in which the light beam is sensed by light detector 13. The light detector and waveshaper 13 will generate an output signal during the period of time that the light is being detected by the light detector. This signal turns on gate 40 which allows pulses from oscillator 43 to step a counter 41. Oscillator 43 is synchronized to the speed of the disk 11 by means of sync pulses received from system timing parameter 14 which was developed from the signals generated by the rotating disk 11. When the light beam is shut off, the count in counter 41 represents the position of the light beam as controlled by the position mirror 17 with respect to the triangular aperture 12 on disk 11. The count of counter 41 is buffered into buffer 42 for use by the system. When the light beam is turned off, this condition is sensed by the timing circuitry 14 which causes the contents of counter 41 to be transferred to buffer 42. After a suitable delay to insure that buffering has occurred, another timing signal is generated by system timing generator 14 for resetting the counter in anticipation for generating the count for the next aperture to pass beneath the light beam. In order to provide high accuracy, the frequency of oscillator 43 should be very high such that the period of any cycle represents a very small period of time along base of the triangle. In this example, oscillator 43 is shown to have a frequency of 3,000 cycles per second. Therefore, for track 600, the count in counter 41 would have been 9,000 and for track 1500, the count in the counter would be approximately 19,000. This is done so as to increase the resolution of the value generated for the position of the moving member with respect to the triangular aperture to allow the sensing of the moving member to be off the desired track but not yet moved to another track. As shown in FIG. 5, the base of the triangle represents 27,000 cycles from oscillator 43. This represents approximately a ratio 13 cycles per track. If the 2,100 tracks were in a span of 2 inches, then at the frequency being used in FIG. 5, each cycle would represent 0.7 mils distance along the altitude of the triangle. If a higher frequency was used, then each cycle of the oscillator would represent a smaller distance along the altitude of the triangle, thereby increasing the resolution of the system. In beam addressable files, servo actuators capable of moving the mirror accurately within microinches are available and are adaptable to this system, and normal operation is on the order of 10 MHz.

Figure 6:
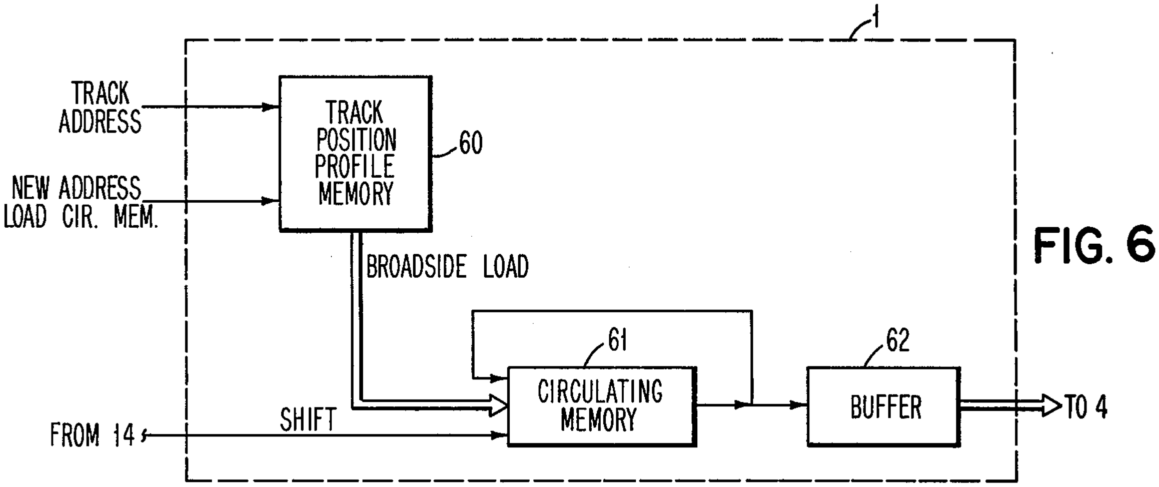
FIG. 6 is a logic diagram of the track position profile sequencer of FIG. 1.

FIG. 6 shows the track position profile sequencer 1 of FIG. 1. A track position profile sequencer 1 contains a track position memory 60 for storing the 64 digital values for each of the tracks to which the system is designed to follow and a circulating memory 61 for outputting in a serial fashion the 64 digital values which are presently loaded within the circulating memory 61. Buffer amplifier 62 is provided for the purposes of supplying an input to subtractor 4. When a track address is inputted to track position profile memory 60 with an indication that a new address has been loaded, the 64 digital values for the track address are loaded broadside into circulating memory 61. Upon the next occurrence of index, shift pulses from system timing generator 14 will be received which will shift the 64 digital values stored in the circulating memory in sequence with the occurrence of the 64 triangular apertures 12 on the disk 11 such that the value in buffer 62 is in the commanded value that should be measured by the triangle then being measured by present position circuitry as shown in FIG. 4. Circulating memory 61 is only loaded once for each new address that is inputted into the system and is repeatedly circulated by circulating memory 61 such that the path of sequential commands is repeatedly sequenced.

Figure 7:
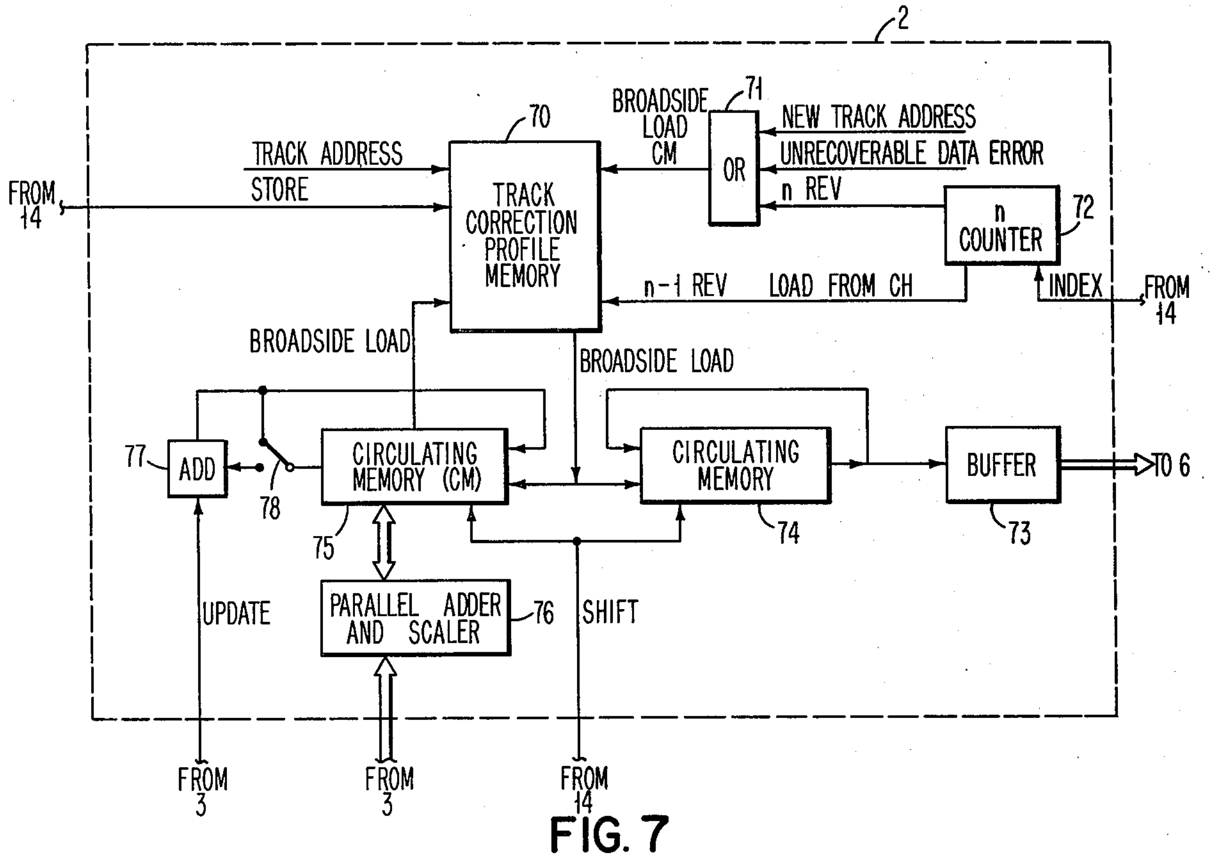
FIG. 7 is a logic diagram of the track correction profile sequencer of FIG. 1.

FIG. 7 shows the track correction profile sequencer 2 of FIG. 1. Track correction profile sequencer 2 contains the track correction profile memory 70 which contains 64 digital correction values for each track such that there exists one correction value for every command value that exists in track position profile memory 60 of track position profile sequencer 1. The output of track correction profile memory is loaded into circulating memory 75 and 74. The output of circulating memory 74 is fed to buffer 73 which acts as an input for adder 6. The action of circulating memory 74 and buffer 73 is in the same manner as the action of circulating memories 61 and buffer 62 in the track position profile sequencer 1 of FIG. 6.

Circulating memory 75 is used for the purpose of updating the track correction profile memory presently being used by the system by means of circulating memory 74 and buffer 73. Adder circuitries 77 and 76 are alternative embodiments for modifying the contents of circulating memory 75 and will be discussed in more detail with relationship to FIG. 8. The contents of the addressed track of track correction profile memory 70 is loaded into circulating memories 75 and 74 upon the occurrence of a new track address.

Another initiation for loading circulating memories 75 and 74 would be that an unrecoverable data error was sensed within the system which might have been caused by a change in the repeatable error. The repeatable error change will have modified the track correction profile memory 70 but will not as yet have been loaded into circulating memories 75 or 74. This initiation causes the information to be loaded in an attempt to recover the otherwise unrecoverable data errors.

Another initiation for loading of circulating memories 74 and 75 is initiated after every *n* revolutions which are sensed by counting the number of indexes by counter 72. This is done under the premise that the contents of the correction profile for the track being used could be updated in memory every $n-1$ revolution and therefore a new track correction profile is available for use by the system after *n* revolutions. The number of revolutions may be any number and an arbitrary value of 10 revolutions is used for the purpose of this discussion.

Therefore, at the end of every ninth revolution, the contents of circulating memory 75 which will contain the updated version of the track correction profile will be loaded into the track correction profile memory 70 for the track address being inputted into the system at that time. Upon the tenth revolution, the contents of that track address will be reloaded into circulating memories 75 and 74 for use by the system. Further, the contents of circulating memory 75 is again stored within the track correction profile memory 70 upon the command from the system timing generator that the last triangle has been sensed for the last revolution and that a new track address is being inputted into the system such that the last complete correction cycle for the track presently being followed will be loaded into the track correction profile memory for use the next time that address is selected by the system.

Figure 8:
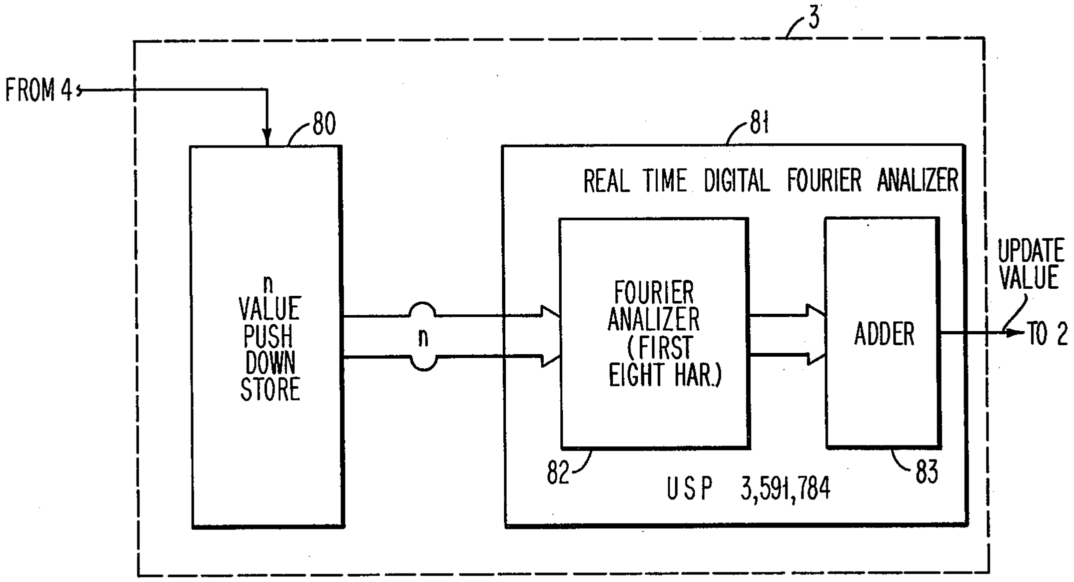
FIG. 8 is a logic drawing of the track correction profile generator of FIG. 1.

FIG. 8 shows the track correction profile generator. The track correction profile generator 3 is comprised of a push-down storage 30 and a real-time digital Fourier analyzer 81. The push-down storage 80 stores the last 64 digital values of the error signal that have been generated for the path being followed under the control of the command positions being generated by the track position profile sequencer 1 and the track correction profile sequencer 2. As each new error signal is generated for an associated actual measured value, the value of that error signal is entered into the push-down store and the oldest error value is dropped out of the store. The 64 digital values represent one complete cycle of operation for one revolution of disk 11. In effect, push-down store 80 has the values necessary to plot one revolution of error values generated by the system. Real-time digital Fourier analyzer 81 is of the type taught in U.S. Pat. No. 3,591,784 entitled "Real-Time Digital Fourier Analyzer" by J. T. Cutter et al. Effectively for the sake of discussion, within this application, the real-time digital Fourier analyzer 81 can be thought of as being composed of a Fourier analyzer 82 for extracting the fundamental and second through eighth harmonic of the fundamental frequency of the repeatable error that is found in the waveform as represented by the 64 values 64 in push-down store 60. The output of Fourier analyzer 82 is therefore a set of 64 digital values, one set for the fundamental frequency and one set for each of the second through eighth harmonic being analyzed. Adder 83 adds together all like components of the eight frequencies being analyzed for each of the 64 positions and basically outputs 64 digital values, one value to be associated with each of the 64 correction values associated with the track being addressed by the system at the present time. Each value will be the summation of the component of the fundamental and second through eighth harmonic that was found during the Fourier analysis of the waveform as represented in the push-down store 80. In order to obtain a correction signal, it is classically necessary to invert these values to cause movement that will be in a direction such that the repeatable error component within the error generated signal from subtractor 4 will be nulled.

Returning now to FIG. 7 and to how the correction of the track correction profile stored within circulating memory 75 is obtained. In one embodiment, it is desired only to correct that value of the circulating memory that was last used during the last sampling period. This value is located in the first position of the circulating memory 75 which would be circulated by the feedback loop and entered into the last stage of the circulating memory 75 upon the next shift position.

Switch 78 would therefore be in the position such that the output of the first stage of circulatling memory 75 would be an input to adder 77. Adder 77 receives from the track correction profile generator 3 the correction value (the sum of the correction components of the fundamental frequency and the first eight harmonics that were associated with that position within the push-down store 80 with the last value inserted into the push-down store). Adder circuitry 77 adds these two values and inserts the summation into the last stage of the circulating memory after the shift pulse has been received from the system timing generator 14. In following this manner, it can be realized that each value of the track correction profile will be updated one time for each revolution of disk 11.

However, it may be desired that since the correction values have been obtained for all 64 values located within circulating memory 75 that circulating memory 75 may be updated for all the values therein contained. All 64 values are therefore outputted from track correction profile generator 3 to be added to circulating memory 75 by parallel adder 76. The values received from track correction profile generator 3 are scaled by a factor of 1/64th and it is this value that is added to the present values in circulating memory 75. After the addition is performed by parallel adder 76, the summation is restored in circulating memory 75 and then shifted by the shift pulse generated from the system timing generator 14. It should be realized that in this way each of the 64 values will be updated 64 times for a given revolution of disk 11. It is interesting to note that if the repeatable error remains a constant throughout that given revolution, then the resulting correction to circulalting memory 75 by the parallel addition method will result in the same value as if each of the values were only updated once by the previously described method. The parallel method incorporates a means for averaging out transients which might occur during a single revolution and which would have a greater effect on a one-time updating of a value during a given revolution rather than over updating the values 64 times for the same given revolution. In essence, the parallel method makes the system more insensitive to noise.

To further make the system more insensitive to transients within the servo system, the updating values of circulating memory 75 are not used immediately but rather are only used after *n* revolutions. As previously discussed, one revolution prior to the *n* revolution, the contents of circulating memory 75 are loaded into track correction profile memory 70 such that when the address is recalled out on the *n*th revolution, the track profile that is loaded in the circulating memory 74 will be of the values that existed in circulating memory 75, one revolution prior to the *n*th revolution and therefore represents an updated value for the system to use.

In operation, the system is commanded to follow a given track address which will cause the track position profile sequencer 1 and track correction profile sequencer 2 to generate a series of signals in time sequence with the rotation of disk 11 to cause mirror 17 to follow the path as defined by track position profile sequencer 1. The actual position of mirror 17 is generated and subtracted from the command to generate an error signal. This error signal is then used to control the position of the servo system during the next sampling period in combination with the values received from the track correction profile sequencer for the period next to be measured. These two signals are combined by adder circuitry 6, converted to an analog signal by D to A converter 7 and operate actuator 9 through power amplifier 8. The advantage of a track correction profile is that it is in a proper phase relationship so as to anticipate the error component that would be generated due to repeatable errors within the system.

The track correction profile generator 3 constantly monitors the error signals being generated and extracts from them the components of the repeatable error which exists within the error signals being generated by the comparison of the commanded positions in the actual positions during the revolution of disk 11. These values are used to update the track correction profile for the track being used and from time to time, the corrected track correction profile is substituted for the track correction profile presently being used such that the system will approach a point that the repeatable error component within the error signal being generated at the output of subtractor 4 will be nulled. When a new track is addressed, the last correction profile is stored within the track correction profile sequencer 2 such that when this address is again commanded, there will exist a prediction of what the correct repeatable error correction profile will be for that track under the assumption that the system has not gone through any change during the time that the address was last called for by the system. Changes in repeatable error are slow and occur over a period of time and do not appear as instantaneous errors. Therefore, the system is capable of learning the changes of the repeatable error component of the system and is capable of correcting for it. The track correction profile for each of the tracks generally is a fair estimation of the repeatable error associated with that track after a given track is first used.

The described system also has several advantages in that although the track position profile sequencer was described to define a circular track about the center of disk 11, the track may in fact be other than circular and can be initialized into any format that the user so desires. Once the track position profile sequencer 1 is initialized, however, the system will tend to follow the path therein described and to provide track correction profiles for each of those tracks so as to null any repeatable error component within the system.

It should further be noted that track correction profile generator 3 was taught to be a real-time digital Fourier analyzer and could, in fact, be replaced by a properly programmed computer which would do the Fourier analysis. Further, it is not necessary to only perform a Fourier analysis to obtain the repeatable error components from the error signals by means of track correction profile generator 3. There are many other algorithms that could be used which would provide the same information. This teaching is that that information is to be extracted and used for the purpose of updating the track correction profile for the track presently being used. It was found that the best embodiment known at the present time would be to use a Fourier analysis to obtain these harmonic components, however, there are other mathematical algorithms which could be used to obtain the same desired results. Further, the memory units of track position profile sequencer 1 and track correction profile sequencer 2 may be, in fact, part of a same memory which is partitioned to store the given information.

Although this invention has been particularly shown and described with reference to the preferred embodiment thereof, it will be understood by those skilled in the art that the foregoing and other changes in form and detail may be made therein without departing from the spirit and scope of the invention.

We claim:

1. An adaptive servo system comprising:

a track position profile sequencer for generating a sequence of $n$ define position signals;

a track correction profile sequencer for generating a sequence of $n$ correction signals, each of said $n$ correction signals being associated with a corresponding $n$ define position signal generated by said track position profile sequencer;

a present position decoder for generating an output signal indicative of the actual present position of the member being moved and controlled by the servo system;

an error generator connected to the track position profile sequencer and the present position decoder for generating an error signal indicative of the difference between the one of said $n$ define position signals being generated by said track position profile sequencer and the output signal of the present position decoder for defining the difference between the commanded position as commanded by the track position profile sequencer and the actual position as defined by the present position decoder;

track correction profile generator connected to the present error generator for generating an output connected signal indicative of the repeatable error component of the error signal presently being generated by the present error generator;

updating means within said track correction profile sequencer connected to said track correction profile generator for updating the correction profile associated with the track presently being followed so as to correct the correction profile to cause the repeatable error component of the error signal to approach a zero value when the corrected correction profile is used by the track correction profile sequencer to generate said sequence of $n$ correction signals.

2. An adaptive positioning system comprising:

a track position profile sequencer comprising:

a track position profile memory for storing the position profile for each track of a plurality of tracks, the position profile for each track being stored as a sequence of $n$ position values, and a position signal generator connected to said track position profile memory for sequentially transmitting each of said $n$ position values associated with a presently addressed track; a track correction profile sequencer comprising;

a track correction profile memory for storing the correction profile for each of a plurality of said tracks, the correction profile for each track being stored as a sequence of $n$ correction values so that there exists a corresponding correction value for each position value in said track position profile memory;

a correction signal generator connected to said track correction profile memory for sequentially transmitting each of said $n$ correction values for the track presently being addressed;

updating means connected to said track correction profile memory for modifying the track correction profile of the track presently being addressed as stored within the track correction profile memory;

an actual position detector for generating an actual position signal indicative of the present position of the member being controlled by said positioning system;

an error generator for generating an error signal indicative of the difference between the value of the position signal being transmitted by said track position profile sequencer and the actual position signal being generated by said actual position detector;

a track correction profile generator comprising;

a storage for storing the last $k$ values of the error signal generated by said error generator;

a repeatable error detector connected to said storage for extracting the repeatable error component from the $k$ values of the error signal stored in said storage and for generating an output repeatable error correction signal, said output repeatable error correction signal being connected as an input to said updating means of said track correction profile sequence generator so as to modify the track correction profile to cause the repeatable error component in the error signal generated by said error generator to approach zero.

3. The adaptive positioning system of claim 2 wherein said updating means employs the repeatable error correction signal to modify only the correction value that was associated with the position signal that was used in conjunction with the actual position signal which generated the last error signal value to be stored in said storage of said track correction profile generator.

4. An adaptive position system as set forth in claim 2 wherein repeatable error detector generates a repeatable error correction signal for each of the $n$ correction values associated with the track being addressed for each new error signal value generated by said error generator, and said updating means modifying each of said $n$ correction values associated with the track correction profile of the track presently addressed by the associated repeatable error correction signal for each of said $n$ correction values such that each of said $n$ correction values will be updated $n$ times each time the track correction profile is used.

5. An adaptive position system as set forth in claim 2 further comprising combination means connected to said error generator and said correction signal generator of said track correction profile sequencer for combining the transmitted correction value with the error signal generated by said error generator to form a command signal, said control signal controlling the actuator used to move the member under control of the adaptive position system.

6. An adaptive servo system as set forth in claim 2 wherein said actual position detector comprises:
- an actuator;
- a light source for emitting a light beam;
- a light detector for detecting the presence of the beam from said light source;
- a disk rotatably mounted, said disk having a plurality of apertures, each of said apertures being in a triangular form, said apertures being uniformly located on a concentric track on said disk;
- reflecting means attached to said actuator for reflecting said light onto said concentric track of said disk such that the light beam will impinge the triangular apertures on said concentric track;
- present position decoder generating a position signal by measuring the time period that said light beam passes through each of said apertures on said disk, said time period representing the actual position of said member.

7. The adaptive positioning system of claim 6 wherein said disk has $n$ apertures.

8. An adaptive position system as set forth in claim 3 further comprising combination means connected to said error generator and said correction signal generator of said track correction profile sequencer for combining the transmitted correction value with the error signal generated by said error generator to form a command signal, said control signal controlling the actuator used to move the member under control of the adaptive position system.

9. An adaptive position system as set forth in claim 4 further comprising combination means connected to said error generator and said correction signal generator of said track correction profile sequencer for combining the transmitted correction value with the error signal generated by said error generator to form a command signal, said control signal controlling the actuator used to move the member under control of the adaptive position system.

10. An adaptive servo system as set forth in claim 3 wherein said actual position detector comprises:
- an actuator;
- a light source for emitting a light beam;
- a light detector for detecting the presence of the beam from said light source;
- a disk rotatably mounted, said disk having a plurality of apertures, each of said apertures being in a triangular form, said apertures being uniformly located on a concentric track on said disk;
- reflecting means attached to said actuator for reflecting said light onto said concentric track of said disk such that the light beam will impinge the triangular apertures on said concentric track;
- present position decoder generating a position signal by measuring the time period that said light beam passes through each of said apertures on said disk, said time period representing the actual position of said member.

11. The adaptive positioning system of claim 10 wherein said disk has $n$ apertures.

12. An adaptive servo system as set forth in claim 4 wherein said actual position detector comprises:
- an actuator;
- a light source for emitting a light beam;
- a light detector for detecting the presence of the beam from said light source;

- a disk rotatably mounted, said disk having a plurality of apertures, each of said apertures being in a triangular form, said apertures being uniformly located on a concentric track on said disk;
- reflecting means attached to said actuator for reflecting said light onto said concentric track of said disk such that the light beam will impinge the triangular apertures on said concentric track;
- present position decoder generating a position signal by measuring the time period that said light beam passes through each of said apertures on said disk, said time period representing the actual position of said member.

13. The adaptive positioning system of claim 12 wherein said disk has $n$ apertures.

14. An adaptive servo system as set forth in claim 5 wherein said actual position detector comprises:
- an actuator;
- a light source for emitting a light beam;
- a light detector for detecting the presence of the beam from said light source;
- a disk rotatably mounted, said disk having a plurality of apertures, each of said apertures being in a triangular form, said apertures being uniformly located on a concentric track on said disk;
- reflecting means attached to said actuator for reflecting said light onto said concentric track of said disk such that the light beam will impinge the triangular apertures on said concentric track;
- present position decoder generating a position signal by measuring the time period that said light beam passes through each of said apertures on said disk, said time period representing the actual position of said member.

15. The adaptive positioning system of claim 14 wherein said disk has $n$ apertures.

16. An adaptive servo system as set forth in claim 8 wherein said actual position decoder comprises:
- an actuator;
- a light source for emitting a light beam;
- a light detector for detecting the presence of the beam from said light source;
- a disk rotatably mounted, said disk having a plurality of apertures, each of said apertures being in a triangular form, said apertures being uniformly located on a concentric track on said disk;
- reflecting means attached to said actuator for reflecting said light onto said concentric track of said disk such that the light beam will impinge the triangular apertures on said concentric track;
- present position decoder generating a position signal by measuring the time period that said light beam passes through each of said apertures on said disk, said time period representing the actual position of said member.

17. The adaptive positioning system of claim 16 wherein said disk has $n$ apertures.

18. An adaptive servo system as set forth in claim 9 wherein said actual position detector comprises:
- an actuator;
- a light source for emitting a light beam;
- a light detector for detecting the presence of the beam from said light source;
- a disk rotatably mounted, said disk having a plurality of apertures, each of said apertures being in a triangular form, said apertures being uniformly located on a concentric track on said disk;

reflecting means attached to said actuator for reflecting said light onto said concentric track of said disk such that the light beam will impinge the triangular apertures on said concentric track;

present position decoder generating a position signal by measuring the time period that said light beam passes through each of said apertures on said disk, said time period representing the actual position of said member.

19. The adaptive positioning system of claim 18 wherein said disk has *n* apertures.

* * * * *